United States Patent
Scheidel et al.

(10) Patent No.: US 10,261,776 B2
(45) Date of Patent: Apr. 16, 2019

(54) AUTOMATED DEPLOYMENT AND SERVICING OF DISTRIBUTED APPLICATIONS

(71) Applicant: Microsoft Technology Licensing, LLC, Redmond, WA (US)

(72) Inventors: William L. Scheidel, Seattle, WA (US); Robert M. Fries, Sammamish, WA (US); Srivatsan Parthasarathy, Bellevue, WA (US); Alan C. Shi, Redmond, WA (US); James P. Finnigan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/960,489

(22) Filed: Apr. 23, 2018

(65) Prior Publication Data
US 2018/0285093 A1    Oct. 4, 2018

Related U.S. Application Data

(63) Continuation of application No. 14/874,660, filed on Oct. 5, 2015, now Pat. No. 9,952,852, which is a
(Continued)

(51) Int. Cl.
*G06F 8/60* (2018.01)
*G06F 8/61* (2018.01)
(Continued)

(52) U.S. Cl.
CPC .................. *G06F 8/65* (2013.01); *G06F 8/60* (2013.01); *G06F 8/61* (2013.01); *G06F 8/70* (2013.01);
(Continued)

(58) Field of Classification Search
CPC ...... G06F 8/60; G06F 8/70; G06F 2009/4557; G06F 2009/45562; G06F 11/0709
(Continued)

(56) References Cited

U.S. PATENT DOCUMENTS 7,356,679 B1 * 4/2008 Le ..................... G06F 17/30067
713/1
8,266,254 B2    9/2012 Garrison et al.
(Continued)

OTHER PUBLICATIONS

Zheng et al., "Automatic Configuration of Internet Services", 2007.*

*Primary Examiner* — Phillip H Nguyen
(74) *Attorney, Agent, or Firm* — The Watson I.P. Group, PLC; Vladan M. Vasiljevic

(57) ABSTRACT

Deployment and servicing tasks associated with multi-tier, distributed applications, application environments and data centers are automated so that a person does not have to manually perform these tasks. All of the information describing and defining the distributed service is modeled and stored in a re-useable service template that can be used to drive an automated system to programmatically deploy and manage the service over time. Deployment and servicing of a distributed application can be automated using re-useable models that capture hardware and workload definitions. The re-useable models in the form of service templates enable delta-based servicing of the application. The service can be deployed to one or more physical machines, one or more virtual machines or to a combination thereof. A default deployment plan can be customized with instance-specific customizations of service parameters.

20 Claims, 4 Drawing Sheets

Related U.S. Application Data continuation of application No. 14/105,192, filed on Dec. 13, 2013, now Pat. No. 9,152,402, which is a continuation of application No. 12/712,222, filed on Feb. 25, 2010, now Pat. No. 8,627,309.

(51) Int. Cl.

| | |
|---|---|
| *G06F 8/65* | (2018.01) |
| *G06F 8/70* | (2018.01) |
| *G06F 8/71* | (2018.01) |
| *G06F 11/07* | (2006.01) |
| *G06F 9/445* | (2018.01) |
| *G06F 9/455* | (2018.01) |
| *H04L 12/24* | (2006.01) |
| *H04L 29/08* | (2006.01) |

(52) U.S. Cl.
CPC ...... *G06F 9/45558* (2013.01); *G06F 11/0709* (2013.01); *H04L 41/082* (2013.01); *H04L 67/34* (2013.01); *G06F 8/71* (2013.01); *G06F 9/44505* (2013.01); *G06F 2009/4557* (2013.01); *G06F 2009/45562* (2013.01)

(58) Field of Classification Search
USPC .................................. 717/172; 709/220, 222
See application file for complete search history.

(56) References Cited

U.S. PATENT DOCUMENTS

| | | |
|---|---|---|
| 8,266,616 B1 | 9/2012 | Jacquot et al. |
| 8,312,419 B2 | 11/2012 | Wilcock et al. |
| 8,776,038 B2 | 7/2014 | Larimore et al. |
| 2008/0163171 A1 | 7/2008 | Chess et al. |
| 2010/0257536 A1* | 10/2010 | Srinivasan ............... G06F 8/63 718/105 |
| 2010/0313200 A1 | 12/2010 | Rozee et al. |
| 2011/0029963 A1* | 2/2011 | Smith .................... H04L 67/34 717/171 |

* cited by examiner

AUTOMATED DEPLOYMENT AND SERVICING OF DISTRIBUTED APPLICATIONS

CROSS REFERENCE TO RELATED APPLICATIONS

This application is a continuation of Ser. No. 14/874,660, filed on Oct. 5, 2015, entitled "AUTOMATED DEPLOYMENT AND SERVICING OF DISTRIBUTED APPLICATIONS", which is a continuation of Ser. No. 14/105,192, filed on Dec. 13, 2013, entitled "AUTOMATED DEPLOYMENT AND SERVICING OF DISTRIBUTED APPLICATIONS", which is a continuation of Ser. No. 12/712,222, filed on Feb. 25, 2010, entitled "AUTOMATED DEPLOYMENT AND SERVICING OF DISTRIBUTED APPLICATIONS", the entirety of which are incorporated herein by reference.

BACKGROUND

The word "distributed" in computer science originally referred to computer networks where individual computers were physically distributed within a geographical area. Current usage of the term, however, is much broader and can also refer to autonomous processes that run on the same physical computer. While there is no single definition of a distributed system, a distributed system typically has several autonomous computational entities (computers or nodes) that communicate with each other by message passing. A distributed application is a computer program that runs in a distributed system.

A distributed system may have a common goal, or each computer may have its own user with individual needs. The purpose of the distributed system may be to coordinate the use of shared resources or to provide communication services to the users. The system may include different kinds of computers and network links, and the system may change during the execution of a distributed program. Often, each computer has a limited, incomplete view of the system, knowing only its own function.

Distributed systems are used when the application needs a communication network that connects several computers. Additionally, there are many circumstances in which the use of a single computer would be possible in principle, but the use of a distributed system is beneficial because it is more cost-effective to obtain the desired level of performance by using a number of less expensive computers instead of a single more expensive computer. A distributed system can be more reliable than a monolithic system because the function of the system does not depend on a single computer. Moreover, a distributed system may be easier to expand than a system with only one processor.

Examples of distributed systems and applications of distributed computing include telecommunication networks such as telephone networks and cellular networks, computer networks such as the Internet, wireless sensor networks and routing algorithms; network applications such as the world wide web and peer-to-peer networks, multiplayer online games and virtual reality communities, distributed databases and distributed database management systems, network file systems and distributed information processing systems such as banking systems and airline reservation systems; real-time process control such as aircraft control systems and industrial control systems, parallel computation, scientific computing, including cluster computing and grid computing, various volunteer computing projects, distributed rendering in computer graphics and so on. Distributed systems include server data centers, Internet data centers, web farms and so on. Distributed applications include any applications that run on distributed systems, as, for example, Internet services and websites.

SUMMARY

Deployment aspects of a multi-tier application can be modeled in a coordinated fashion as a service template. Once the service template has been defined, a user such as an Administrator can direct the automatic deployment of the service into an environment using a customizable workflow. After deployment, the service can be automatically kept up to date with changes based on a differencing operation performed on the original service template (a first service template) and the revised service template (a second service template). The differencing operation can determine a list of actions to be taken to make the deployed service comply with the revised service template. The list of actions determined by the differencing operation can be automatically implemented by a deployment and/or servicing manager.

Re-useable models of distributed applications called system templates can be created. Automated deployment of a distributed application can be performed based on the re-useable models. Re-useable hardware/workload definitions can be captured by the re-useable models and can be used for automated creation of physical and virtual machines. A default orchestration for distributed application deployment can be extended by providing instance-specific customizations for service parameters for the application. Once deployed, automated servicing of a distributed application can be performed by determining the delta of a revised or new version of a service template from the original service template so that the actions that are needed to be taken on a deployed application to make it comply with the revised model are automatically identified and performed. Orchestration of delta-based servicing of distributed applications can be extended or customized by creating a customized service plan or workflow.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

In an environment such as a datacenter, deploying a logical application typically involves more than one machine. Typically a number of machines constitute a front end such as a web front end of an Internet application. The front end may communicate with another set of machines comprising the middle tier of the application and both the front end and the middle tier may communicate with a back end such as a database back end. The collection of machine tiers and the connectivity between the tiers are all parts of the distributed service. Today, distributed services are typically managed by managing the individual machines of the distributed service. This process generally involves several different Administrators who coordinate through e-mail or meetings to determine the overall requirements of the application. Once the requirements are identified, the majority of the configuration process is done manually, leading to errors and failures on initial deployment. A complete description of the whole distributed application typically does not exist.

The subject matter disclosed herein describes methods, systems and computer program products to automate the deployment and management of a group of machines that are logically related and perform some overall application function. Deployment and servicing tasks associated with multi-tier, distributed applications, application environments and data centers are automated so that a person or persons do not have to manually perform these tasks. These tasks include but are not limited to: handover, configuration, application of updates and patches, lifetime management including starting and stopping a service (in contrast to starting and stopping a machine) and other such tasks as known in the art. By replacing complex, error prone and uncoordinated manual application deployment, instantiation and servicing tasks with automated deployment, instantiation and servicing as described herein, reductions in number of errors, cost and the time needed to perform the tasks can be realized.

All of the information describing and defining the distributed service is modeled and stored in a re-useable service template that can be used to drive an automated system to programmatically deploy and manage the service over time. Deployment and servicing of a distributed application can be automated using re-useable models that capture hardware and workload definitions. The re-useable models in the form of service templates enable delta-based servicing of the application. The service can be deployed to one or more physical machines, one or more virtual machines or to a combination thereof. A default deployment can be customized with instance-specific values for service parameters.

Automated Deployment and Servicing of Distributed Applications

Figure 1:
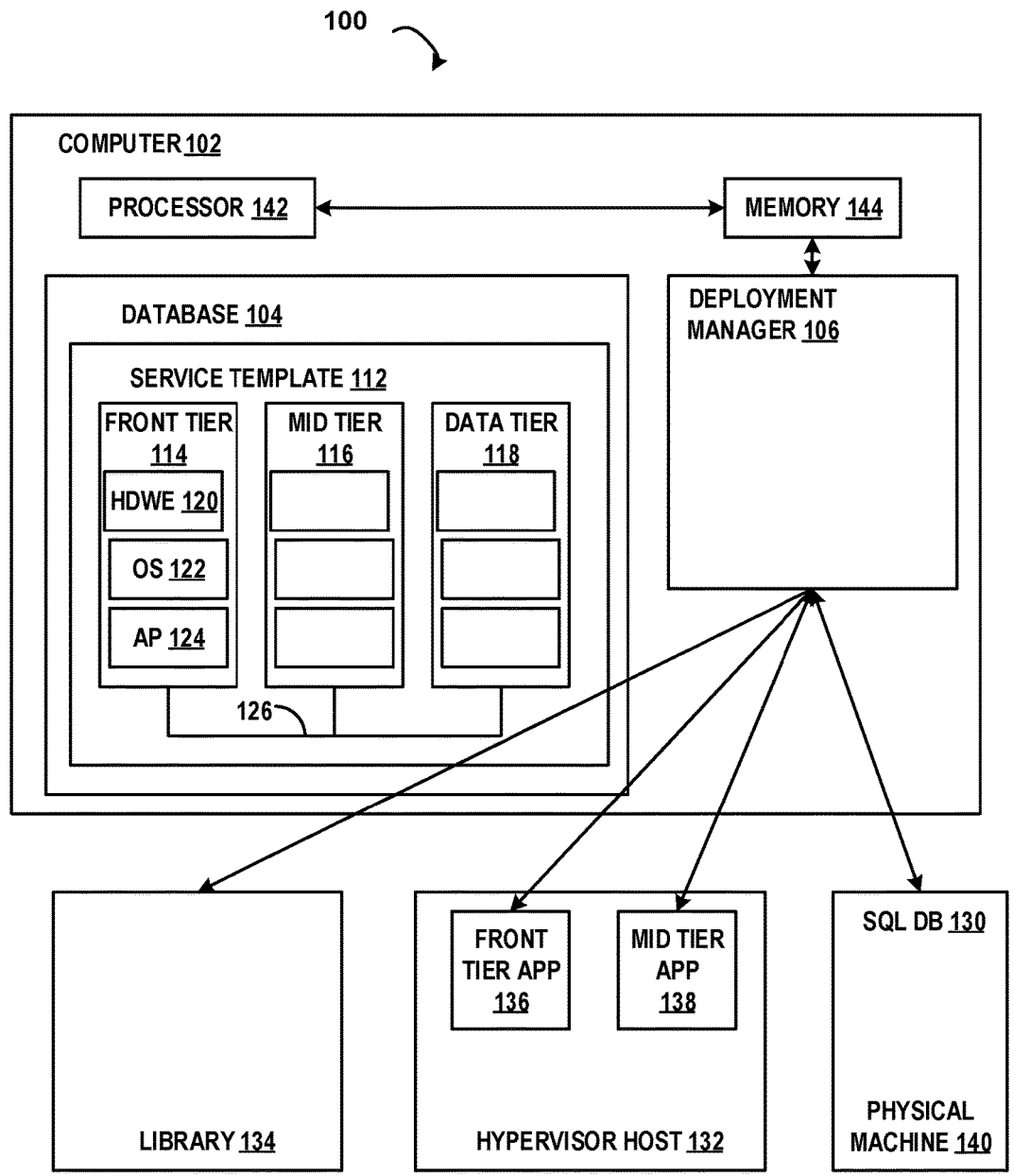
FIG. 1 illustrates an example of a system 100 for automated deployment and servicing of a distributed application in accordance with aspects of the subject matter disclosed herein.

FIG. 1 illustrates an example of a system 100 for automated deployment and servicing of distributed applications in accordance with aspects of the subject matter disclosed herein. All or portions of system 100 may reside on one or more computers such as the computers described below with respect to FIG. 3. All or portions of system 100 may reside on one or more software development computers such as the computers described below with respect to FIG. 4. All or portions of system 100 may reside on one or more application management computers. The system 100 or portions thereof may comprise a portion of an integrated development environment such as the ones described below and illustrated in FIG. 4. Alternatively, system 100 or portions thereof may be provided as a stand-alone system or as a plug-in or add-in. All or portions of system 100 may reside on a distributed service management computer.

Portions of the automatically deployed and/or automatically serviced application can comprise one or more physical machines, one or more virtual machines or any combination of physical and virtual machines. A virtual machine (VM) is a software implementation of a computer that executes programs like a physical machine. In data center virtualization, an abstract layer is created between applications and the underlying server, storage and network infrastructure. Virtual machines can allow the underlying physical machine resources to be shared between different virtual machines. Virtualization can create one logical entity from multiple physical entities or can create many logical entities from one physical entity comprising computing, storage, network or application resources. Each virtual machine may run its own operating system. The software layer providing the virtualization is called a virtual machine monitor or hypervisor. A hypervisor can run directly on the hardware (VM) or on top of an operating system (hosted VM). In virtual machine environments, multiple operating system environments can co-exist on the same computer, but maintain isolation from each other. A virtual machine can comprise a set of electronic files that operate as an additional distinct computer system within the confines of another physical host computer system.

System 100 may include one or more computers such as computer 102. The one or more computers may include one or more of: a processor (such as processor 142), a memory such as memory 144, and one or more modules for automated deployment and servicing of distributed applications. Other components well known in the arts may also be included but are not here shown. It will be appreciated that the module(s) for automated deployment and servicing of distributed applications can be loaded into memory 144 to cause one or more processors such as processor 142 to perform the actions attributed to the module(s) for automated deployment and servicing of distributed applications.

The modules for automated deployment and servicing of distributed applications may include one or more deployment and/or servicing manager 106. A deployed application can be an online service, a web-based application, Internet application or any other application. The deployment and/or servicing manager 106 can facilitate the modeling of an application to allow for automated deployment and servicing of the application. The modeled application can be a distributed application and can include multiple tiers such as, for example, a front tier, a middle tier and a back end tier. The front tier may but does not necessarily represent a user interface such as a web front end to an Internet application. The middle tier may but does not necessarily comprise the processing portion of an application such as an Internet application and the back end tier may but does not necessarily represent the data or database portion acted upon by the application.

The modules for automated deployment and servicing of distributed applications may operate to deploy a distributed application to one or more physical machines or to one or more virtual machines or to a combination thereof. For example, in FIG. 1 deployment and/or servicing manager 106 deploys a distributed application to a virtual machine comprising a front tier 136 of the application, a virtual machine comprising a middle tier 138 of the application and a physical machine 140 on which a SQL database 130 (an example of a back end tier) resides. In FIG. 1, the virtual machine comprising the front tier 136 of the application and the virtual machine comprising the middle tier 138 of the application run on a physical machine host on which is running a software layer that provides the virtualization, referred to as the hypervisor 132, although it will be appreciated that the subject matter described herein is not so limited. For example, the virtual machine created may comprise multiple physical machines.

The model of the application can be defined using a service template (e.g., service template 112). A database 104 may store a collection of service templates for one or more distributed applications. The service template can include a deployment plan, a customization of how to deploy the application. The service template can include one or more machine tier templates that together comprise a set of templates for a distributed application. Each machine tier template in the set can define one particular tier of the application. For example, in FIG. 1 the front end tier template is front end tier template 114, the mid tier template is mid tier template 116 and the back end tier template is data tier template 118 and so on. Each machine tier template can include one or more hardware templates (e.g., hardware template 120 for front end tier template 114) which defines the hardware characteristics of the tier and one or more workload templates which define the operating system and application configuration of the tier.

The service template can include a workload template that defines the operating system (e.g., operating system workload template 122) and a workload template that defines the application configuration (e.g., application workload template 124). Additionally, the service template can include information regarding the network connectivity between the tiers of the application, illustrated in FIG. 1 by the lines 126 connecting front end tier template 114, mid tier template 116 and data tier template 118. The service template can also include information such as how the "health" of the distributed application is reported. "Health" reporting reports the results of monitoring the state of services and applications, including issues that cause downtime or poor performance, such as unavailable services, long response time, and security breaches. Error conditions that can be reported include exceptions that occurred, errors that occurred, security problem or risk occurred, service unavailability, dependency problems and so on. The service template allows for more than one tier to be defined and allows for customization of operating systems and applications.

Once a service template has been defined, a new instance of the service can be deployed based on the service template. If desired, deployment of the service can be customized by going through a phase called specialization in which instance-specific aspects of the service can be configured such as by providing values of parameters that an application package can expose. Examples of instance-specific aspects of the service can include particular computer names that are to be used or identifying a database connection string that a web tier will use. Once customized (specialized), the service can be deployed into the environment using the customized workflow. In accordance with some aspects of the subject matter disclosed here the customizable workflow can be based on Windows Workflow. This workflow is called a deployment plan and determines the steps that will be used to deploy each tier, configure the operating system, and install any applications. A default deployment plan is available which then may be extended by a user such as an Administrator or ISV (independent software vendor). Metadata in the service template for each tier can control the order in which tiers are deployed. An example of a customization is customizing the workflow to integrate with a custom storage solution, although it will be appreciated that customization is not limited to storage implementations and many other aspects of the workflow can be customized. Physical artifacts and metadata for the application can be deployed from library 134.

After a service has been deployed, a link to the service template that the service was deployed from can be maintained. When or if a service template is later updated to include, for example, a new version of an application, a user such as an Administrator can decide which services to move to the new version of the service template. When a service is moved to a new version of a service template, deployment and/or servicing manager 106 can automatically determine the changes that have been made from the service as originally deployed and can create a list of actions that are to be applied to each tier in the service to make the service match the new version of the service template. The changes represented on the list can then be applied using a customizable workflow called a servicing plan, which is a workflow similar to the deployment plan (service template). This workflow allows a user such as an Administrator to customize how machines are taken out of and put back into service when updates are to be applied. A default servicing plan can be provided which can be extended and customized by a user such as the Administrator or ISV.

Figure 2:
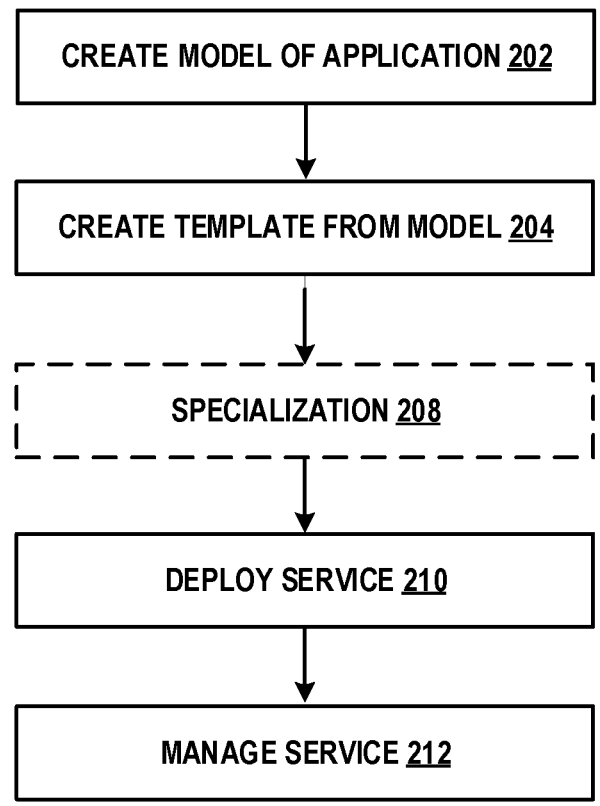
FIG. 2 is a flow diagram of an example of a method 200 for automated deployment and servicing of a distributed application in accordance with aspects of the subject matter disclosed herein as described with respect to FIG. 1.

FIG. 2 illustrates an example of a method 200 for automated deployment and servicing of distributed applications in accordance with aspects of the subject matter disclosed herein. Method 200 or portions thereof may be performed by system 100 or portions thereof as described above with respect to FIG. 1. At 202 a model or a set of models can be created that describe the overall distributed service. The model can be manifested as a machine template that can include constructs called profiles that define the hardware and software portions of the distributed service. Profiles are units that supply portions of instructions for creating individual machines and can be used to build a machine tier template. A hardware profile can include descriptions of hardware including but not limited to disk drives, memory, DVD drives and other hardware elements.

Workload profiles describe the configuration of the operating system and applications that are to be deployed on a distributed system. For example a workload profile can describe what kind of operating system will be deployed to a particular virtual machine, including identification of the operating system image disk to be used in deployment. A workload profile can also define the application workload that is to be deployed. For example a SQL application may be specified. At 204 the profiles can be combined into a machine tier template that describes how to build an individual machine. A hardware profile and a workload profile can be combined to create a machine tier template that specifies how a particular machine will be created. A machine tier template describes how to create an individual machine and can be used to create multiple machines having substantially identical characteristics.

Multiple machine tier templates can be combined to create a service template that describes how to put together an overall service. A service template for an application typically includes a number of different machine tier templates. The network connectivity between the different machines that are part of the service is also included in the service template. Thus, the set of models or service template serve as a blueprint to describe how to create an instance of a service. The service template describes everything the service includes and describes the logical grouping of the machines that comprise the service. The service template serves as the description for how the service is deployed.

The service template can be used by an orchestration engine portion of the deployment and/or servicing manager to initiate and perform the automated deployment of the service. The orchestration engine executes a workflow comprising a set of steps that are used to put together each individual machine of the distributed service. Hence, a deployment and/or servicing manager can receive a service template and based on the service template the deployment and/or servicing manager can create machines that are deployed according to the instructions contained in the service template at 210. Alternatively, instance-specific values can optionally (signified by hatched lines in FIG. 2) be specified in a process called specialization so that deployment of the service can be customized at 208. Multiple activities are orchestrated in an overall flow that produces all of the machines that are needed for the service.

After the service has been created, because the model (template) from which the service was created is known, a number of management tasks can take place at 212. For example, if a machine deployed from the template changes over time so that it differs from the machine created by the template, the deployment and/or servicing manager can enact the change(s) by applying the delta determined by the differencing operation. A configuration that provides load balancing among the machines can be provided. Lifetime management tasks such as starting or stopping a service (instead of starting or stopping a machine) can be performed. A particular tier of service can be easily scaled out because another machine can be created that has the same characteristics as any other machine that was created from the service template. For example, suppose that when a service was deployed a single web server was sufficient to handle customer traffic. Over time, the application may get more and more customers, so that more and more identical web servers are needed to handle the traffic. The web server portion of the application can be easily scaled out by creating additional web servers having substantially identical characteristics to the original web server using the appropriate template.

The distributed service can be serviced, based on the service template. For example, a new template for the service can be created. For example, the original description of the service (the service template) can be cloned and a new version created by modifying some aspects of the original service template. For example, the amount of RAM for a particular machine tier may be changed by changing the amount of RAM on that machine. Thus the new version of the service template may have some changes from the original version of the template from which the service was created.

When the new template is complete, an instance of the deployed service can be specified along with the new service template. Because the original version of the service template that the service was created from is known and because the revised version of the service template is known, a differencing operation can be performed to discover the changes between the two versions of the template. That is, the incremental changes needed to make the already deployed service comply with the new service template can be determined using a differencing operation that automatically determines how to apply changes to the deployed service to make it comply with the new version of the service template. From the list of changes discovered, the changes to the particular machines in the service instance that was created from the original version of the template can be applied so that it complies with the new version of the service template. These changes can be applied using a customizable workflow called a servicing plan, which is a workflow similar to the deployment plan. This workflow allows Administrator to customize how machines are taken out of and put back into service when updates need to be applied. A default servicing plan is available which then may be extended by the Administrator or ISVs.

Hence instead of managing at the level of the individual machine as known in the field, it is possible to manage at a higher level of abstraction, at the service level, rather than at the level of the individual machine, whether managing deployment or managing servicing or managing the distributed application over time. For example, instead of starting or stopping an individual virtual machine, the distributed service can be started or stopped. Moreover, fine-grained control of the action is provided.

Example of a Suitable Computing Environment

Figure 3:
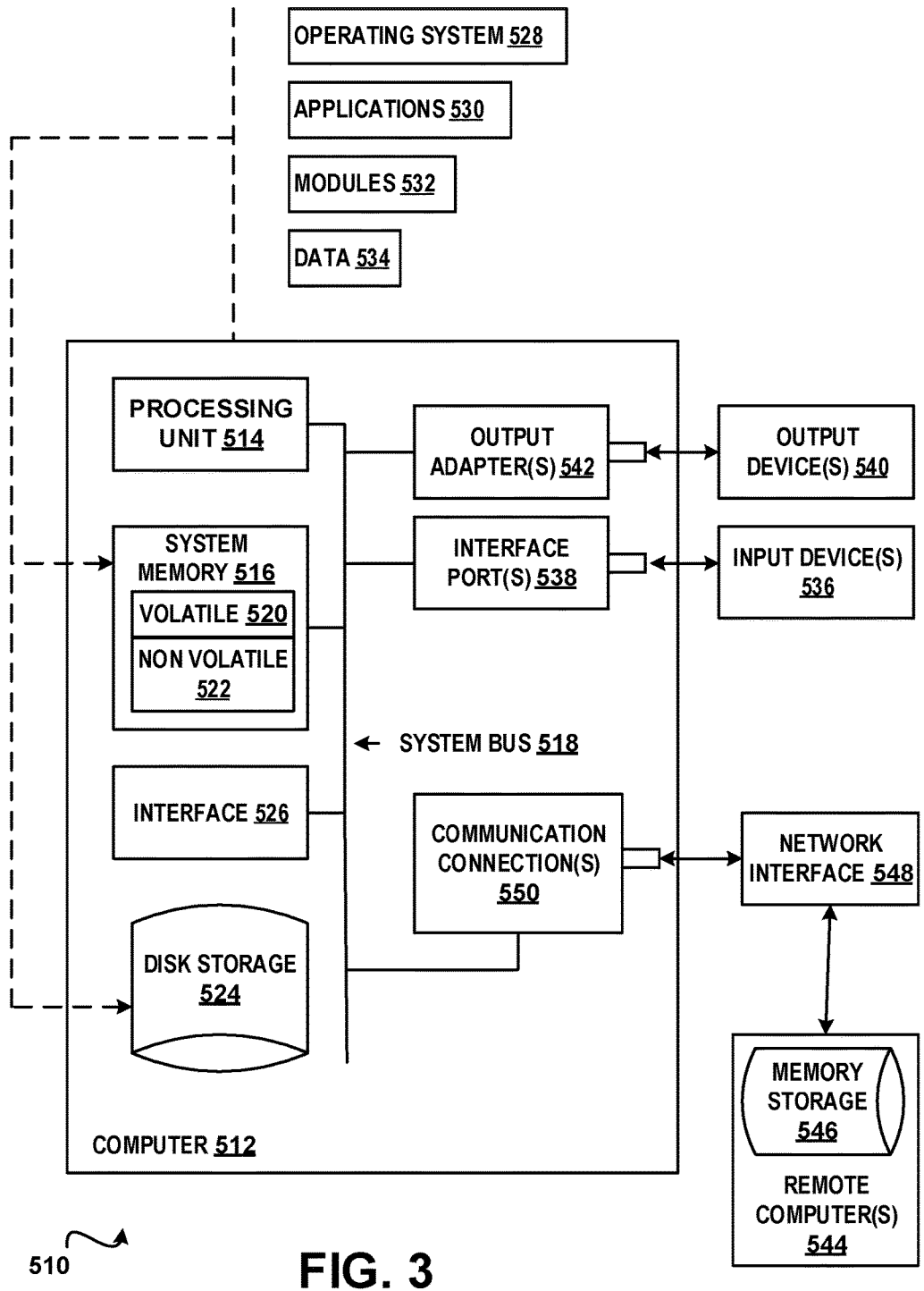
FIG. 3 is a block diagram illustrating an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device for efficient resumption of co-routines on a linear stack in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 4. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
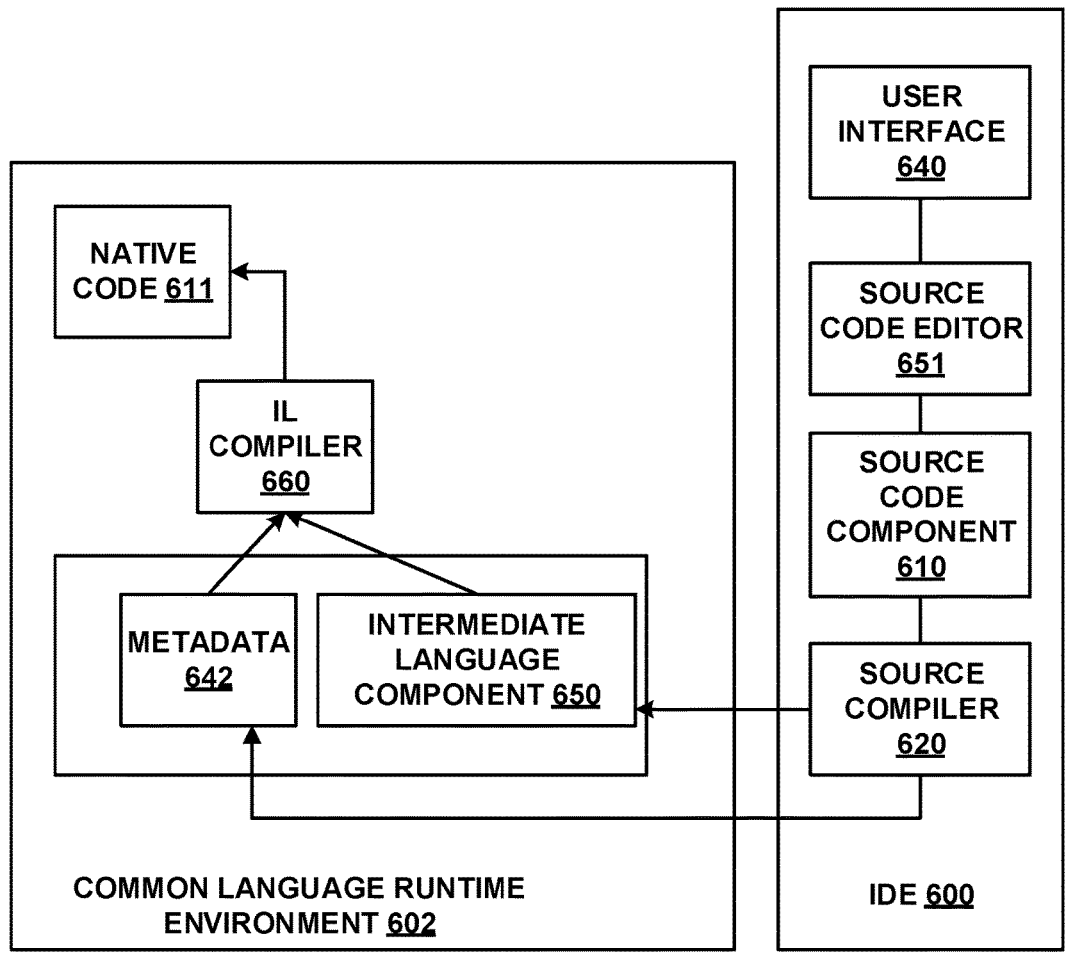
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A method implemented in a programming environment for software development or application management, the method comprising:

obtaining a first service template comprising a first set of machine tier templates and a first workload profile;

obtaining a second service template that is an update to the first service template;

performing a differencing operation between the first and second service templates; and determining one or more actions to be taken to implement changes identified by the differencing operation, thereby updating a distributed service from a first version of the distributed service that conforms to the first service template to a second version of the distributed service that conforms to the second service template;

wherein each machine tier template in the first set of machine tier templates comprises a hardware profile that defines a hardware configuration associated with the distributed service, the hardware profile supplying instructions that are used for automated configuration of individual machines utilized to implement the distributed service; and wherein the first workload profile defines a configuration of a software application associated with the distributed service, the workload profile supplying instructions that are used for the automated configuration of the individual machines used to implement the distributed service.

2. The method of claim 1, wherein the one or more actions comprise a first set of actions that stop the distributed service and a second set of actions that restart the distributed service.

3. The method of claim 2, wherein the first set of actions that stop the distributed service comprise actions that shut down the individual machines used to implement the distributed service in a defined order.

4. The method of claim 2, wherein the second set of actions that restart the distributed service comprise actions that restart the individual machines used to implement the distributed service in a defined order.

5. The method of claim 1, wherein the one or more actions are applied on a tier-by-tier basis.

6. The method of claim 1, wherein the distributed service comprises a first tier of machines that, in aggregate, implement a front end of the distributed service, and a second tier of machines that, in aggregate, implement a back end of the distributed service; and wherein further the one or more actions comprise actions to be taken to update, on a tier-by-tier basis individual machines of at least one of: the first tier or the second tier, based on differences, identified by the differencing operation, between the first set of machine tier templates and a second set of machine tier templates that are part of the second service template.

7. The method of claim 1, wherein the one or more actions comprise the applying of at least one of: patches or updates, to at least one of: a hardware or a software, of at least some of the individual machines utilized to implement the distributed service.

8. The method of claim 1, wherein the one or more actions comprise actions to be taken to update one or more of the individual machines utilized to implement the distributed service based on differences, identified by the differencing operation, between the first workload profile and a second workload profile that is part of the second service template.

9. The method of claim 1, wherein the first service template further comprises a first specification of a network connectivity between the individual machines utilized to implement the distributed service; and wherein further the one or more actions comprise actions to be taken to update the network connectivity between the individual machines based on differences, identified by the differencing operation, between the first specification of the network connectivity and a second specification of the network connectivity that is part of the second service template.

10. A system comprising:

a processor and a memory including a module configured to cause the processor to:

obtain a first service template comprising a first set of machine tier templates and a first workload profile;

obtain a second service template that is an update to the first service template;

perform a differencing operation between the first and second service templates; and determine one or more actions to be taken to implement changes identified by the differencing operation, thereby updating a distributed service from a first version of the distributed service that conforms to the first service template to a second version of the distributed service that conforms to the second service template;

wherein each machine tier template in the first set of machine tier templates comprises a hardware profile that defines a hardware configuration associated with the distributed service, the hardware profile supplying instructions that are used for automated configuration of individual machines utilized to implement the distributed service; and wherein the first workload profile defines a configuration of a software application associated with the distributed service, the workload profile supplying instructions that are used for the automated configuration of the individual machines used to implement the distributed service.

11. The system of claim 10, wherein the one or more actions comprise a first set of actions that stop the distributed service and a second set of actions that restart the distributed service.

12. The system of claim 11, wherein the first set of actions that stop the distributed service comprise actions that shut down the individual machines used to implement the distributed service in a defined order.

13. The system of claim 11, wherein the second set of actions that restart the distributed service comprise actions that restart the individual machines used to implement the distributed service in a defined order.

14. The system of claim 10, wherein the one or more actions are applied on a tier-by-tier basis.

15. The system of claim 10, wherein the distributed service comprises a first tier of machines that, in aggregate, implement a front end of the distributed service, and a second tier of machines that, in aggregate, implement a back end of the distributed service; and wherein further the one or more actions comprise actions to be taken to update, on a tier-by-tier basis individual machines of at least one of: the first tier or the second tier, based on differences, identified by the differencing operation, between the first set of machine tier templates and a second set of machine tier templates that are part of the second service template.

16. The system of claim 10, wherein the one or more actions comprise the applying of at least one of: patches or updates, to at least one of: a hardware or a software, of at least some of the individual machines utilized to implement the distributed service.

17. The system of claim 10, wherein the one or more actions comprise actions to be taken to update one or more of the individual machines utilized to implement the distributed service based on differences, identified by the differencing operation, between the first workload profile and a second workload profile that is part of the second service template.

18. The system of claim 10, wherein the first service template further comprises a first specification of a network connectivity between the individual machines utilized to implement the distributed service; and wherein further the one or more actions comprise actions to be taken to update the network connectivity between the individual machines based on differences, identified by the differencing operation, between the first specification of the network connectivity and a second specification of the network connectivity that is part of the second service template.

19. A method of stopping a distributed service, the method comprising:

obtaining a service template comprising:
  a workload profile that defines a configuration of an operating system and applications deployed on individual machines that implement the distributed service; and
  a set of machine tier templates comprising:
    machine templates for a first tier of machines that, in aggregate, implement a front end of a distributed service; and
    machine templates for second tier of machines that, in aggregate, implement a back end of the distributed service;
  wherein each of the machine tier templates comprise a hardware profile that defines a hardware configuration associated with the distributed service, the hardware profile supplying instructions that are used for automated configuration of individual machines utilized to implement the distributed service; and
generating, based on the obtained service template, a list of actions to be taken to stop the distributed service, the list of actions specifying an order in which the individual machines that implement the distributed service are to be shut down.

20. The method of claim 19, further comprising:
generating, based on the obtained service template, a second list of actions to be taken to restart the distributed service, the second list of actions specifying a second order in which the individual machines that implement the distributed service are to be restarted.

* * * * *